United States Patent

[11] 3,548,743

[72] Inventor John H. Pikel
 Oaklawn, Ill.
[21] Appl. No. 711,310
[22] Filed Mar. 7, 1968
[45] Patented Dec. 22, 1970
[73] Assignee Chemetron Corporation
 Chicago, Ill.
 a corporation of Delaware

[54] LIQUID EXPRESSING PRESS
 10 Claims, 7 Drawing Figs.
[52] U.S. Cl. ................................................ 100/145,
 99/353
[51] Int. Cl. .................................................. B30b 9/16
[50] Field of Search ...................................... 100/117,
 145, 150; 99/353

[56] References Cited
 UNITED STATES PATENTS
 731,737 6/1903 Anderson .................. 100/145X
 772,230 10/1904 Farner ....................... 100/145X
 829,315 8/1906 Anderson .................. 100/145
 1,421,282 6/1922 Meakin ...................... 100/150X
 1,662,531 3/1928 Meakin ...................... 100/150
 2,873,663 2/1959 Hawk et al. ................ 99/353
 829,314 8/1906 Anderson .................. 100/117UX
 2,687,084 8/1954 Bowman .................... 100/117X
 2,701,518 2/1955 McDonald ................. 100/117X
 2,975,096 3/1961 Ginaven et al. ............ 100/117
 3,055,291 9/1962 Ginaven ..................... 100/117
 FOREIGN PATENTS
 1,025,267 2/1958 Germany ................... 100/145

Primary Examiner—Walter A. Scheel
Assistant Examiner—Leon G. Machlin
Attorney—Nicholas M. Esser ABSTRACT: Apparatus having a perforate housing through which liquid is expressed from a liquid-containing material by independently rotated screw conveyors that subject the material to varying pressures.

PATENTED DEC 22 1970

Inventor
JOHN H. PIKEL
By
Attorney

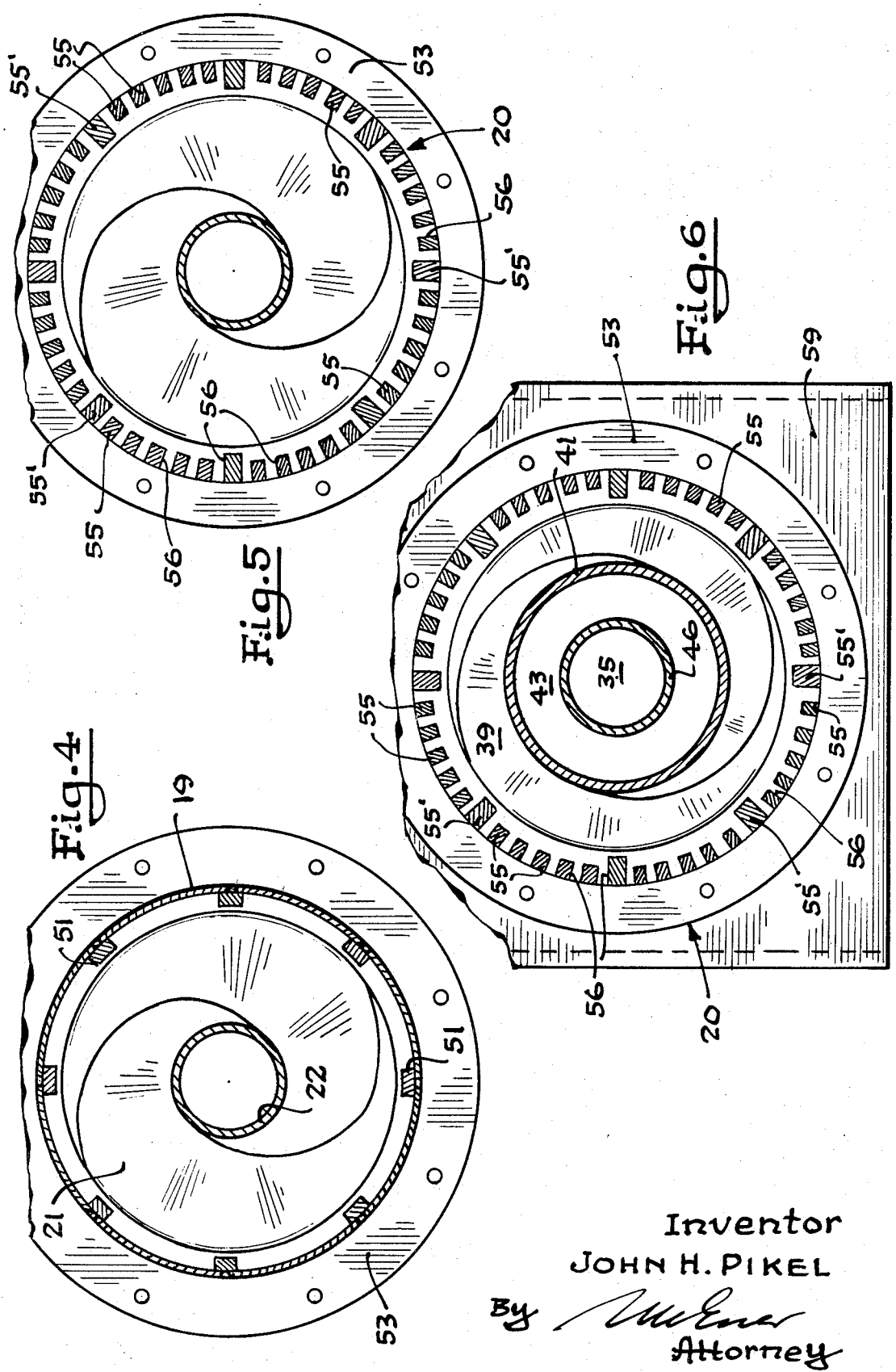

LIQUID EXPRESSING PRESS

This invention relates to apparatus for materially increasing the density of raw material solids which contain relatively large quantities of liquid, and is useful in a rendering process wherein otherwise undesirable animal matters are used to make beneficial products including tallow and edible, high protein meals. In particular the apparatus continuously and effectively handles cracklings from suet, fat, scraps, trimmings and inedible hard parts of animal bodies in the preparation of a protein concentrate which is used principally as feed for animals and fowl.

During rendering, the raw materials are ground or sized prior to cooking since the raw material is more quickly rendered when it is cut uniformly into small pieces. In addition, less mechanical strain is placed on the rendering equipment when these relatively small pieces are being moved during the process than if randomly cut, large pieces are used. In a continuous rendering process, reduced particle size is particularly important for a practical minimum cooking time. Various pieces of machinery such as prebreakers, mills, grinders, hogs, and hashers, wash and grind larger particles of the meat scraps and inedible hard parts of animals into relatively small, uniform portions. These ground and sized particles are blended in a surge tank from which they are pumped into a cooker for rendering by dehydration. During the rendering process the fatty animal tissue is broken down and lards, tallows and greases are released in liquid form. Immediately after cooking, the cracklings are deposited in percolating pans wherein some of the liquid is drained from the solids. These drained solids, called unpressed cracklings, are supplied in a heated condition to the press of this invention wherein most of the remaining liquid is expressed to produce pressed cracklings. Breakers are frequently used to reduce the pressed cracklings into relatively small pieces which are easy to handle. Later these broken pieces are ground into high protein meal which may be packaged for shipment.

Available presses are inefficient and slow and frequently fines or small particles of the solid material are passed through the press with the liquid. Such particles plug up screens covering the drains. Some of the presses produce a cake of solid, formed material which must be cooled prior to being broken up into a more practical size for use as a meal. Known presses frequently require much hand labor and lost motion and in addition much valuable storage space is required to hold the pressed crackling material during cooling and prior to its being crushed.

This invention comprises a two-stage, horizontal conveyor in a perforate enclosure formed preferably as a slotted cylinder which expresses liquid from unpressed cracklings. A first section of the press contains a helicoid screw conveyor which transports the liquid-containing cracklings along the enclosure so that some free liquid flows or drains away from the cracklings. The conveyor in the first section is driven at a speed which exceeds the product flow rate from a source such as a continuous rendering cooker. By such an arrangement the cracklings are widely distributed and agitated while they are moved along in contact with the perforate walls of the enclosure to provide efficient liquid drainage from the cracklings prior to their being received in a second section of the enclosure.

A helicoidal screw conveyor having flights with decreasing pitch is rotatably mounted in the second section. The central shaft of this variable pitch conveyor is relatively larger than the shaft of the conveyor in the first section and thus the cross-sectional area within the slotted enclosure which is available to be occupied by the cracklings is abruptly decreased. In the illustrated embodiment, the cross-sectional area available to the cracklings in the second section of the apparatus is about one-fourth that available in the first section. The helicoid screw conveyor in the first section and the variable pitch conveyor in the second section are each independently driven by an associated prime mover such as a variable speed motor. By decreasing the volume displacement and pitch and reducing the rotational speed of the conveyor in the second section, the crackling flow is progressively retarded and a gradual compression is effected between the larger shaft and the slotted enclosure to express a high percentage of the remaining fluids in the cracklings through the openings in the enclosure. The speed of the two conveyors can be varied to provide a desired pressing effect for treating various rendered products which may be moved at variable flow rates through the continuous rendering system. A cake breaker adjacent the discharge end of the apparatus reduces the size of the pressed cracklings as they emerge from the variable pitch screw conveyor.

It is the principal object of this invention to provide a simple and efficient apparatus for increasing the density of moisture containing materials.

A feature of this invention is to provide a worm assembly for use on a rotatable shaft in a continuous press barrel wherein the worm flight arrangement and the rotational speed of the worm is such that a pressure build up efficiently expresses liquid products from and compacts a material which contained the products.

Another feature of this invention is to provide a grid cage assembly which produces effective grease extraction and provides large quantities of free grease which is substantially unaccompanied by fine pieces of the material being pressed.

An additional object of this invention is to provide an apparatus for continuously processing grease bearing materials to produce pressed cakes of the dried material which are reducible to a size that is easily handled.

Yet another object of this invention is to provide apparatus for rapidly and efficiently producing pressed cracklings from rendered animal matter, such as suet, meat, inedible hard parts and the like.

A further feature of this invention is to provide a product treatment apparatus which reduces labor requirements and lends itself to an automated line of product processing.

Still another object of this invention is to provide a liquid expressing press which is highly efficient and is of rugged, durable construction.

Further objects as well as features and advantages of this invention will become apparent as the following description of an illustrated embodiment thereof proceeds and is given for the purpose of disclosure and is taken in conjunction with the accompanying drawings in which like character references designate like parts throughout the several views and where:

FIG. 4 is a vertical sectional view taken along line 4—4 of FIG. 1B looking in the direction indicated by the arrows;

FIG. 5 is a vertical sectional view taken along line 5—5 of FIG. 1B looking in the direction indicated by the arrows; and FIG. 6 is a vertical sectional view taken along line 6—6 of FIG. 1B looking in the direction indicated by the arrows.

Figure 1A:
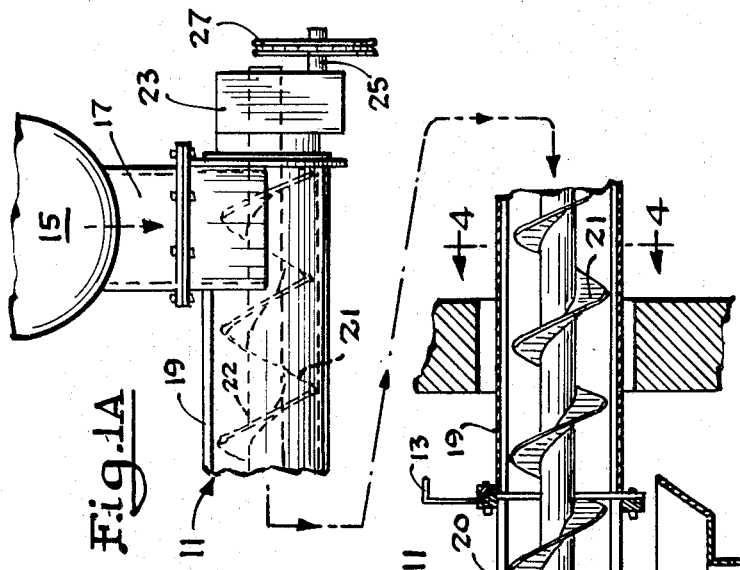
FIG. 1A is a vertical sectional view through the material receiving end of a liquid expressing press incorporating the principles of this invention.
Figure 1B:
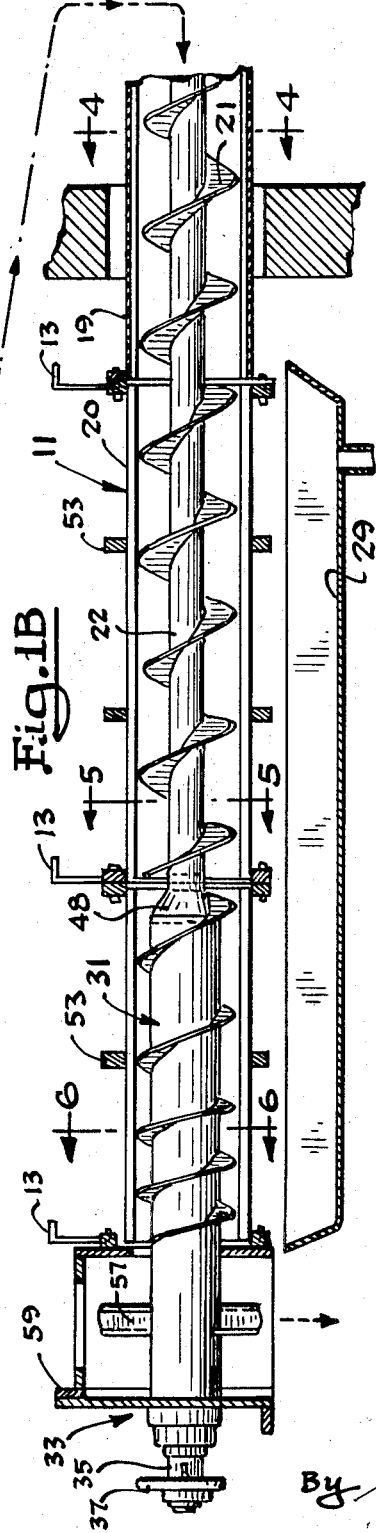
FIG. 1B is a similar view showing the discharge portion of said press.

Referring now to the several figures and first to FIGS. 1A and 1B, a liquid expressing press 11 embodying this invention is held in a generally horizontal position by supports 13. A moisture-containing product, such as unpressed cracklings is transferred from a cooker 15 of a continuous rendering system through a chute 17 into the receiving end of a cylindrical press housing 19. Unpressed cracklings contain a mixture of fluids, such as liquefied greases, tallows and lards. The housing 19 encloses a screw auger or conveyor 21 which is supported at its outer end by conventional bearings and is rotatable about its horizontally disposed, longitudinal axis through interconnected gear means contained within a gear box 23. A shaft 25 which is operatively connected to the gears inside the box 23 carries a pulley 27 on its outer end. The pulley 27 is connected by means such as a chain belt to suitable drive means (not shown) whereby when the pulley is rotated the auger 21 is rotated.

Figure 2:
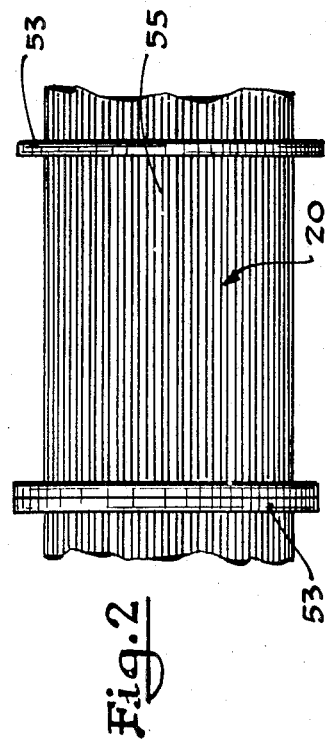
FIG. 2 is a fragmentary top plan view showing the perforated housing of said press.

In the first section of the press 11 the conveyor 21 transports relatively small amounts of the unpressed cracklings and liquid grease through the housing 19 and into a perforate housing portion 20. The small amounts of cracklings and grease are dragged along by the flights of the screw conveyor. The perforate portion 20 of the housing shown in FIG. 2 is slotted to provide means of egress for a portion of free liquid grease to flow or drain away from the unpressed cracklings as they are moved along through the housing. A drip pan 29 is positioned below the perforate portion of the housing 19 to catch the free liquids flowing out of the press. The conveyor 21 is driven at a constant predetermined speed which exceeds the flow rate of the material being discharged from the cooker 15 into the apparatus. The conveyor speed is selected so that the unpressed cracklings are widely distributed and agitated while they are in contact with the perforate portion of the housing 19. In this way maximum drainage of the liquids from the unpressed cracklings is possible before they are moved into a second section of the press where additional liquid is squeezed from the solid material comprising the cracklings.

In the second section of the press, the housing 19 is suitably perforate and encloses a variable pitch, helicoidal screw conveyor 31 which is mounted at its outer end in conventional bearings at 33 for rotation about its horizontally disposed, longitudinal axis. A shaft 35 extends from the outer end of the conveyor 31 and carries a pulley 37 which is keyed to the shaft in conventional manner. As the pulley 37 is rotated by drive means (not shown) the conveyor is rotated about its longitudinal axis. The helicoidal flightings 39 are attached to the screw conveyor 31 so that the pitch between successive flights progressively diminishes as the flights approach the outer end of the conveyor 31'. In this way as the cracklings are moved along by the conveyor 31, the area between adjacent flight is successively diminished and the cracklings are subjected to increased pressure.

Figure 3:
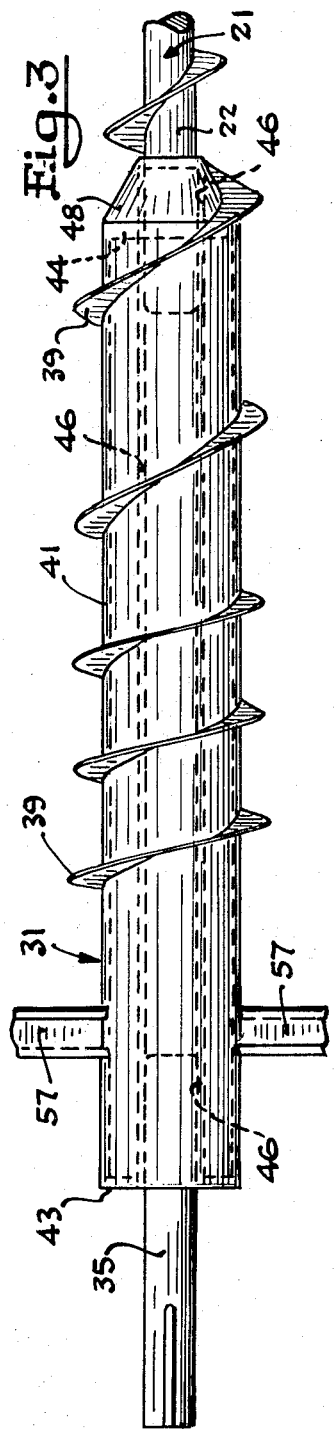
FIG. 3 is an elevational view of the conveyors removed from the press shown in FIG. 1B.

As shown in FIGS. 1B and 3 the shaft of conveyor 31 is of a larger diameter than the shaft of conveyor 21. The inside diameter of the housing 19 surrounding the conveyors 21 and 31 is constant and thus with the cross-sectional area of the shaft of the conveyor 31 being larger than the shaft of the conveyor 21, the space available for the cracklings is reduced in the area of the press containing the conveyor 31. In the embodiment shown the helicoidal flightings 39 of the screw conveyor 31 are attached to a cylindrical body portion 41. End rings 43 and 44 are attached as by welding, to the ends of the cylindrical body 41. A cylindrical tube 46 is mounted coaxially inside of the body 41 and is attached to the end rings 43 and 44. The shaft 35 extends into and is affixed to the inside wall of the outer end of the cylindrical tube 46 so that as the shaft is rotated by its associated drive means, the screw conveyor 31 is rotated. A portion of the shaft 22 of the auger 21 extends into the open end of the tube 46 (FIG. 3) and is loosely mounted therein so as to be rotatable within the tube 46. The tolerance between the outside of the shaft 22 and the inside of the tube 46 and the length that the shaft extends into the tube cooperate to align the axis of the screw conveyors 21 and 31. The shaft 22 and the tube 46 are sufficiently spaced so that conveyors 21 and 31 can be independently rotated by their respective drive means about the single axis extending between the bearings at the outer ends of the conveyors. Thus, the conveyors 21 and 31 are operable at different rotational speeds.

As seen in FIG. 3 the cylindrical tube 46 extends a short distance beyond the end ring 44. A transition portion 48 having an external surface in the shape of a frustum of a cone is affixed about the extending portion of the tube 46. The transition portion gradually increases the shaft circumference of the conveyor 31 from the outer boundary of the shaft 22 to that of the body 41. Thus as the drained cracklings are moved from the end of the conveyor 21, they are moved into and are picked up by the helicoidal flightings 39 of the conveyor 31. Simultaneously the drained cracklings are compressed into a relatively smaller annular space in the portion of the housing containing the conveyor 31 because the area within the housing 19 occupied by the body 41 of conveyor 31 is greater than the area occupied by the shaft 22 of conveyor 21. Further as hereinabove described the space between adjacent flighting of conveyor 31 is diminished so that as the cracklings are moved along they are subjected to increased compressive force. This structural arrangement increases the pressure exerted on the cracklings and forces most of the liquid from the cracklings. By controlling the speed of the conveyors 21 and 31, it is possible to vary the quantity of cracklings contained between the flightings of the two conveyors, the dwell time of the cracklings within the influence of the two conveyors and the compressive forces exerted on the cracklings between the conveyor and the inside of the housing.

As seen in FIG. 4, the cylindrical housing 19 has longitudinal bars 51 attached to its inner surface. The bars are spaced around the inner circumference and extend radially inwardly toward the housing axis. The conveyor 21 is positioned with the housing so that the flight crests of the conveyor 21 are spaced a short distance from the surface of the bars 51. By being spaced around the inner surface of the housing 19, the bars 51 provide an irregular surface over which the cracklings are moved. As the screw turns the cracklings being moved along by the flightings pass along and over the irregular surface. This interrupted and discontinuous motion and agitation increases the tendency of the cracklings to become intermingled so that some of the liquid carried by the cracklings flows therefrom.

The housing 19 is held in its cylindrical arrangement by a number of rings 53 which are fixed about the housing along its length. The rings 53 hold the housing together and prevent the radial expansion of the housing due to the pressure exerted by the conveyor on the solids being pressed.

In FIGS. 5 and 6 the perforate portion of the housing is formed of a series of ribs 55 which are attached to the inner surface of the rings 53. The ribs 55 are spaced to provide substantially radially extending fluid discharge passages 56 each of which is defined by a pair of adjacent ribs 55. Ribs 55' extend radially inwardly a preselected distance beyond the ribs 55 and are arranged so that each of the ribs 55' has at least one of the shorter ribs 55 on each side. In the embodiment shown each of the relatively long ribs 55' is separated by a number of shorter ribs 55. The conveyor 31 is positioned within the perforate portion of the housing 20 that the crests of the flightings 30 of the conveyor 31 are spaced a short distance from the ribs 55'. As the cracklings are moved along the perforate portion by the conveyor 31 they are moved against the interrupted surface which is provided by the ribs 55'. This substantially increases the mixing of the cracklings as they are being pressed against the ribs and increases the recovery of fluid material from the cracklings. The ribs 55 and 55' being longitudinally arranged along the length of the housing 19 act as spaced strainer bars to retain the solid crackling particles within the housing while the fluid is being pressed therefrom.

After the compressed and densified cracklings are moved beyond the flightings 39 they are engaged by breaking bars 57 which extend radially outward from the body 41 of the conveyor 31. The bars 57 have sharp surfaces which engage the densified cracklings material and break the cracklings into portions of a reduced size which can be conveyed to other apparatus for further processing. The breaking bars 57 rotate within a rectangular housing 59 which is open at the bottom for discharge of the crackling product having a reduced moisture content.

Described briefly the operation of the press is as follows: A quantity of fluid bearing material, such as cracklings is introduced mechanically or manually into the chute 17 which opens into the screw conveyor 21. The screw flights of the conveyor 21 receive the unpressed cracklings and urge them longitudinally through the housing 19. The material is agitated and some pressure may be applied whereby some of the fluid is disassociated from the material. The conveyor 21 urges the material into the flightings of the conveyor 31 having a shaft which is larger than the conveyor 21 and flightings with diminishing pitch. Because of the difference in shaft size and pitch, increased pressure is applied on the material as it is moved longitudinally along by conveyor 31 through the housing. The conveyors 21 and 31 are independently driven and their speeds are variable. The speed of the conveyor 31 is relatively slower than that of the conveyor 21. This further increases the compressive forces exerted on the cracklings. By the combined increase in shaft diameter, decrease in pitch between flightings, and the relatively slower rotational speed of the conveyor 31, steadily increasing pressure is applied to the cracklings until the majority of the fluid is expressed therefrom. Because the perforate portion of the housing is provided with substantially radially extending fluid discharge passages each of which is defined between adjacent ribs, the fluid expressed from the material passes easily from the press and is collected in the drip pan 29. Some of the ribs 55' extend radially inwardly beyond the ribs 55 to provide interrupted damming of the material being moved through the press. This reduces the tendency of the material to rotate with the conveyor and increases the efficiency of the press and forces a higher proportion of the contained fluid from the material. The bars 57 break up the densified materials coming from the conveyor so that the material can be easily moved from the press for further processing.

Thus, it will be appreciated that all of the recited objects, advantages and features of this invention have been demonstrated as obtainable in a highly practical apparatus and one that is simple and positive in operation. It will be further understood that although this invention has been described with respect to certain specific embodiments thereof, this invention is not limited thereto, since various modifications of said invention will suggest themselves to those skilled in the art from the aforesaid description and are intended to be encompassed within the scope of the appended claims wherein there is claimed:

I claim:

1. A press for fluid removal from a mixture of fluids and solids comprising: a cylindrical housing having an inlet for admitting the mixture and an outlet for discharging densified portions of the mixture, at least a portion of the housing wall being perforate to conduct the fluids from the housing and to block passage of the solids from the housing; a first rotatable screw conveyor mounted in the housing to receive the mixture and advance the mixture into the housing in contact with the perforate wall of the housing for draining a portion of the fluid from the mixture; first means for rotating the first conveyor at a selected variable speed; a second rotatable screw conveyor mounted in the housing adjacent the first conveyor and having helicoidal screw flights, said second conveyor being adapted and arranged to advance the mixture from the first conveyor toward the outlet and to compress the mixture against the perforate wall; and second means for rotating the second conveyor at a different selected variable speed to retard the advance of the mixture and effect controlled compression of the mixture.

2. The press as claimed in claim 1 wherein the shaft diameter of the second conveyor is substantially greater than the shaft diameter of the first conveyor.

3. The press as claimed in claim 1 wherein the pitch of the helicoidal flights progressively decreases along said second conveyor in the direction of the movement of the mixture.

4. The press as claimed in claim 3 wherein the shaft of the second conveyor is of a larger diameter than the diameter of the shaft of the first conveyor, said helicoidal screw flights having decreasing pitch and the larger diameter of the second shaft subjecting the mixture to increasing pressures as the mixture is moved along the second shaft whereby still more fluid is pressed from the mixture.

5. The press as claimed in claim 4 wherein the first means is rotated at a speed in excess of mixture flow into the inlet for widely distributing and agitating the mixture being advanced by the first conveyor.

6. The press as claimed in claim 5 wherein a first annular space is defined between the housing and the shaft of the first conveyor, the first annular space being of an area four times greater than the area of a second annular space defined between the housing and the shaft of the second conveyor.

7. The press as claimed in claim 6 wherein the second shaft further comprises a nonuniform section in the form of a frustum of a cone with the smaller end of the frustum adjacent the first shaft.

8. The press as claimed in claim 7 wherein the second conveyor further comprises means for successively shearing off fragments of the densified mixture and for moving the fragments from the discharge opening.

9. The press as claimed in claim 8 wherein the shearing means comprises a plurality of angularly disposed blade members.

10. The press as claimed in claim 9 wherein the housing comprises a plurality of longitudinally arranged strainer bars, adjacent ones of said bars being spaced from each other.